United States Patent
Cleveland et al.

(10) Patent No.: US 7,873,673 B2
(45) Date of Patent: Jan. 18, 2011

(54) METHOD AND SYSTEM FOR DATA AGGREGATION IN A SENSOR NETWORK

(75) Inventors: Joseph Cleveland, Murphy, TX (US); Shu Wang, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 496 days.

(21) Appl. No.: 12/073,158

(22) Filed: Feb. 29, 2008

(65) Prior Publication Data

US 2008/0215609 A1    Sep. 4, 2008

Related U.S. Application Data

(60) Provisional application No. 60/892,726, filed on Mar. 2, 2007.

(51) Int. Cl.
*G06F 17/30* (2006.01)
(52) U.S. Cl. .................. 707/802; 707/803; 707/804
(58) Field of Classification Search .......... 707/100, 707/802–804; 340/500, 539.11, 540
See application file for complete search history.

(56) References Cited

U.S. PATENT DOCUMENTS

| | | | | |
|---|---|---|---|---|
| 7,406,214 | B2* | 7/2008 | Rhoads et al. | 382/289 |
| 2002/0033706 | A1* | 3/2002 | Khazei | 324/750 |
| 2004/0066970 | A1* | 4/2004 | Matsugu | 382/217 |
| 2004/0137915 | A1* | 7/2004 | Diener et al. | 455/456.1 |
| 2004/0176958 | A1* | 9/2004 | Salmenkaita et al. | 704/275 |
| 2004/0178467 | A1* | 9/2004 | Lyon et al. | 257/440 |
| 2005/0049924 | A1* | 3/2005 | DeBettencourt et al. | 705/21 |
| 2005/0060372 | A1* | 3/2005 | DeBettencourt et al. | 709/206 |
| 2005/0177317 | A1* | 8/2005 | Hsiung et al. | 702/22 |
| 2005/0264429 | A1* | 12/2005 | Hermary et al. | 340/870.06 |
| 2006/0130070 | A1* | 6/2006 | Graf | 719/318 |

(Continued)

FOREIGN PATENT DOCUMENTS

EP    1 835 668 A1    9/2007

OTHER PUBLICATIONS

Sharaf et al. "Balancing energy efficiency and quality of aggregate data in sensor networks", Department of Computer Science, University of Pittsburgh, PA, Nov. 12, 2004, pp. 1-20.*

Luca Mottola, et al., "Enabling Scope-Based Interactions in Sensor Network Macroprogramming", 2007 IEEE, 9 pages.

(Continued)

*Primary Examiner*—Wilson Lee
*Assistant Examiner*—Hanh B Thai

(57) ABSTRACT

A sensor profile based data aggregation method for aggregating data in a sensor network, which includes a plurality of sensor nodes, is provided. This method includes steps of determining types of sensors included in the sensor nodes, and generating a sensor profile that includes information on each type of the sensors. The information includes a filtering criterion and aggregation operators defined for the each type of the sensors. Once the sensor profile is created, the profile is parsed into a header file, and the header file is compiled with other sub-modules to generate a sensor profile based aggregation module. The sensor profile based aggregation module is installed in each of the sensor nodes. Whenever, sensor data is received in the sensor node, the data is filtered according to the filtering criterion defined in the sensor profile, and data aggregation is simultaneously with given operators.

16 Claims, 6 Drawing Sheets

U.S. PATENT DOCUMENTS

| | | | |
|---|---|---|---|
| 2006/0152355 A1* | 7/2006 | Suenbuel et al. | 340/511 |
| 2006/0202834 A1* | 9/2006 | Moriwaki | 340/573.1 |
| 2007/0044539 A1 | 3/2007 | Sabol et al. | |
| 2007/0210916 A1* | 9/2007 | Ogushi et al. | 340/531 |
| 2007/0222585 A1* | 9/2007 | Sabol et al. | 340/539.11 |
| 2008/0005287 A1* | 1/2008 | Harvey et al. | 709/220 |

OTHER PUBLICATIONS

Max Van Kleck, et al., "OPF: A Distributed Context-Sensing Framework for Ubiquitous Computing Environments", UCS 2006, p. 82-97.

European Search Report dated Jun. 9, 2009 in connection with European Patent Application No. EP 09 15 2345.

* cited by examiner

METHOD AND SYSTEM FOR DATA AGGREGATION IN A SENSOR NETWORK

CLAIM OF PRIORITY

This application makes reference to, incorporates the same herein, and claims all benefits accruing under 35 U.S.C. §119 from a provisional application earlier filed in the U.S. Patent & Trademark Office on the 2$^{nd}$ of March 2007 and there duly assigned Ser. No. 60/892,726.

BACKGROUND OF THE INVENTION

1. Field of the Invention

The present invention relates to a method of data aggregation and correlation in a sensor network, and a sensor node that implements the method of the data aggregation and correlation.

2. Description of the Related Art

Sensor network nodes have restrictions on resources such as energy, memory, processor speed due to size and cost constraints. Current sensor goals target a sensor size less than 1 mm$^3$. Future sensors will be dust-size. These constraints limit the amount of memory for program and data storage as well as the number of information symbols that can be processed and transmitted.

A principal cause of energy use in a sensor network is data transmission from multiple sensor nodes, many of which may report the same information. Hence, sensor nodes implement data-centric forwarding techniques to reduce unnecessary data transmission. Reasons for data transmission removal include such factors as duplication, out-of-range, or errors in data. Further reductions occur with averaging and correlation techniques. For example, a series of sensing processes that read the same values can be concisely described by an average with a zero standard deviation. The role of data-centric forwarding technique embodies the application of a data aggregation algorithm that operates on the data in-route to the data sink from different sensor nodes in order to remove unnecessary data. Various types of functions are executed in the algorithm.

The focus of topology formation and routing shifts from the traditional address-centric approaches for networking, which is to find short routes between pairs of addressable end-nodes, to a more data-centric approach, which is to find routes from multiple sources to a single destination that allows in-network consolidation of redundant data. Hence, efficient data-centric forwarding technique requires that data aggregation operates to establish the appropriate combination of aggregation operators to optimize energy conservation.

A commonly used tool for data-centric forwarding technique and data aggregation is TinyDB. TinyDB is a query processing system for extracting information from a network of sensors that employs TinyOS as the operating system. It provides a simple, SQL-like interface to specify the data that needs extraction, along with additional parameters, like the rate at which data should be refreshed. The SQL interface supports queries for min, max, sum, count, and average. Given a query that specifies the data of interest, TinyDB collects the data from sensors in the environment, filters it, aggregates it together, and routes it out to a sink that hosts the TinyDB server software.

TinyDB, however, has several disadvantages, which includes that TinyDB uses TinyOS operating system and requires up to 58 KB of program memory, TinyDB employs query types limited to current types of deployed sensors, SQL interface does not support (MIN, MAX) filtering during data aggregation, TinyDB lacks provisions for temporal and spatial correlation and lacks programmability for efficient temporal convolution or filtering.

Therefore, it is necessary to provide a method for a data aggregation algorithm with a structure that supports a greater range of functions with lower program memory requirements and lower processing requirements.

SUMMARY OF THE INVENTION

One of the objectives of the present invention is to provide a method of data aggregation in a sensor network, which enables flexible aggregation configurations and requires lower program memory. Another objective of the present invention is to provide a sensor node that includes a machine readable storage medium that includes the instruction that causes the machine to perform the operation that is constructed according to the data aggregation method of the present invention.

Therefore, one aspect of the present invention is to provide a method for aggregating data in a sensor network that includes a plurality of sensor nodes. The method includes steps of determining types of sensors included in the sensor nodes, generating a sensor profile that includes information on each type of the sensors, generating a sensor profile based aggregation module from the sensor profile, installing the sensor profile based aggregation module to each of the sensor nodes, receiving sensor data via one of the sensor nodes from a local sensor, filtering the sensor data according to the filtering criterion defined for the type of the local sensor, selecting at least one operator for data aggregation among the aggregation operators defined for the each type of the sensors, and performing data aggregation simultaneously with the at least one operator. The information contained in the sensor profile includes a filtering criterion and aggregation operators defined for the each type of the sensors.

The method may further include steps of parsing the sensor profile to generate a header file, and compiling the header file. The step of compiling the header file further includes a step of compiling a data format parser with the header file. The data format parser parses a data input to extract the sensor data. The step of compiling the header file further includes a step of compiling a control block module with the header file. The control block module receives the sensor data from the data format parser and performs data aggregation with the sensor data. The step of compiling the header file further includes a step of compiling a data centric forwarding library with the header file. The data centric forwarding library includes event definition and definitions of the aggregation operators.

The step of performing data aggregation may further include steps of constructing a row vector from the sensor data, constructing a transformation matrix, and multiplying the row vector by the transformation matrix. A number of rows of the transformation matrix is equal to the size of the row vector, and a column of the transformation matrix represents the at least one operator.

Another aspect of the present invention is to provide a sensor node deployed in a sensor network. The sensor node includes a central processing unit, a sensor coupled to the central processing unit, a radio transceiver unit coupled to the central processing unit, and a machine readable storage medium coupled to the central processing unit. The radio transceiver unit communicates with other sensor node. The machine readable storage medium includes an instruction that includes a sensor profile that includes information on each type of local sensors that are deployed in the sensor network. The information includes a filtering criterion and aggregation operators defined for the each type of the local sensors. The instruction causes the central processing unit to perform operations when executed by the central processing unit. The operations includes steps of receiving sensor data from the local sensors through the radio transceiver, filtering the sensor data according to the filtering criterion defined for the type of the local sensor, selecting at least one operator for data aggregation among the aggregation operators defined for the each type of the sensors, and performing data aggregation simultaneously with the at least one operator.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components.

DETAILED DESCRIPTION OF THE INVENTION

Hereinafter, the present invention will be described more completely with reference to the accompanying drawings, in which exemplary embodiments of the invention are shown.

Figure 1:
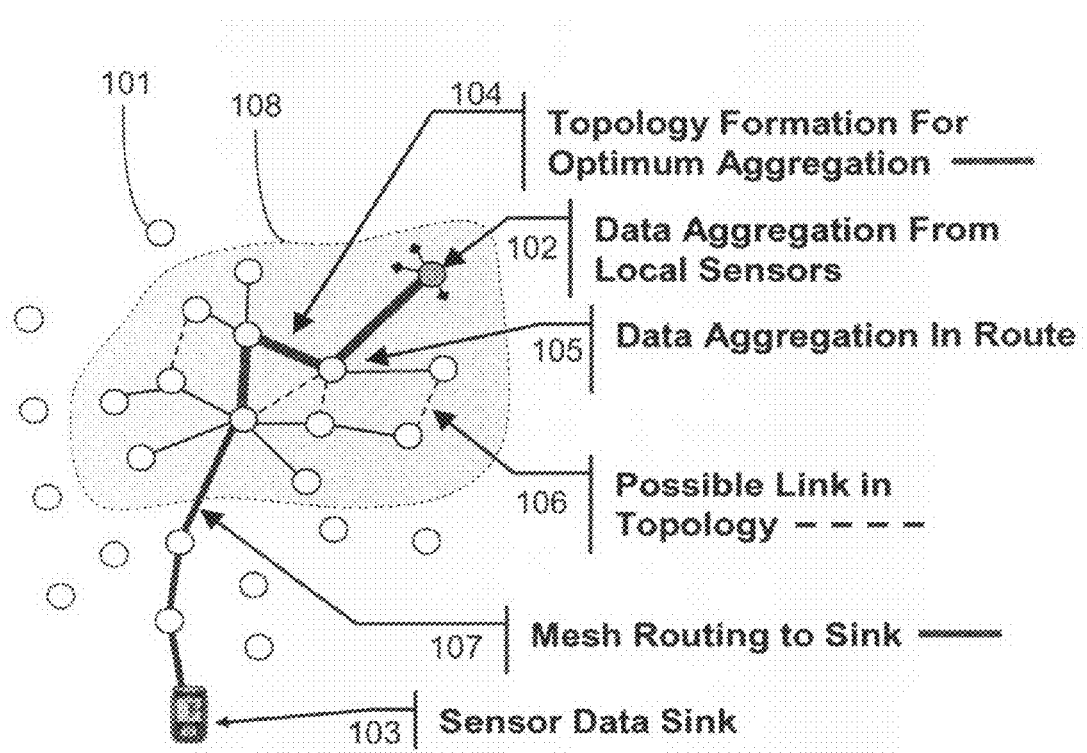
FIG. 1 illustrates a topology and routing scheme for data aggregation in a sensor network.

FIG. 1 illustrates topology formation and routing for data aggregation in a sensor network. Referring to FIG. 1, an open circle represents sensor node 101 that gather sensory information and communicate with other connected sensor nodes. A plurality of sensor nodes is deployed over sensing region 108 where a sensing activity is required.

Sensor node 101 can include multiple types of sensors on it. For example, a sensor node can have a temperature sensor, a humidity sensor, a light sensor, etc on it. Hence, one sensor node can have one or more sensor types on it.

In the sensor network shown in FIG. 1, data aggregation starts at local sensor node 102, which is one of sensor nodes deployed in sensing area 108. Information from local sensor node 102 is sent to sensor data sink 103 through an optimized route that is determined by a data forwarding technique such as a data-centric forwarding technique. First line 104 represents a route for optimum aggregation of data, and first sensor nodes 105 in the path of first line 104 represent sensor nodes through which data aggregation, which starts from local sensor node 102, propagates. Second lines 106 represent routes that are not included in the optimized link in this example, but can be possibly included in an optimized link in another data aggregation. Third line 107 represents a mesh route that is connected to sensor data sink 103. In mesh routing, a router automatically discover their neighbors and learn the shortest path, or mesh route, to the sink or other destination node through the mesh. If a mesh router fails then its neighbors reconfigure the forwarding path and create a new series of hops that circumvent the failed node.

Sink 103 refers to an entity where information is required. Sink 103 can be an entity outside the sensor network. In this case, sink 103 could be an actual device, such as a handheld computer or PDA used to interact with the sensor network, or sink 103 can be a gateway to another larger network such as the Internet. In the Internet case, the actual request for the information comes from some node only indirectly connected to the sensor network. Alternatively, the sink can be designed to belong to the sensor network as another sensor/actuator node.

Sink 103 operates in one of the following methods, or in a combination of two or more of these methods. In a query request driven network, the sink floods a query request message to the sensor nodes in the sensor network, or to a selected region thereof, in a user-demand manner, asking these nodes to return environment information. In a time-driven network, the sensors generate data periodically at a constant rate and send the data to the sink. In an event-driven network, the sensor/actuator nodes generates datagram and transmits them to the sink only when it senses one or more of the target events defined in the sensor profile.

The present invention provides data aggregation method that can be implemented in the sensor network described above. A commonly used tool for data aggregation is TinyDB, but present invention provides an alternative method to replace the TinyDB in the sensor network.

TinyDB uses SQL-like query interface structure to specify aggregation operators. The SQL query scheme is very memory intensive. The present invention provides an approach that uses sensor profile based configuration to specify aggregation and/or correlation operators. The sensor profile based approach ensures only necessary aggregation and/or correlation operators, which are defined in sensor profile. The necessary aggregation and/or correlation operators are compiled, and the minimum footprint is created. In contrast, TinyDB will compile the whole library of aggregation operators to support the query scheme and costs memory. Furthermore, in the sensor profile based approach, a matrix structure is constructed to obtain the data aggregation, which reduces the number of operations, while TinyDB directly uses the original mathematical formulas without optimizing operation costs.

The method and apparatus of the present invention requires an operating system, but does not require use of a specific type of operating system such as TinyOS. The technical literature refers to TinyOS as a product, which was developed by University California-Berkeley and Intel, as well as a class of operating systems suited to sensor processors. In the product category, TinyOS is an open-source, component-model operating system and platform targeting wireless sensor networks (WSNs). It is an embedded operating system written in the nesC programming language as a set of cooperating tasks and processes. The method and apparatus of the invention can be implemented in an operating system such as TinyOS, PicOS, Mantis, Contiki, SOS, and Maté.

In addition, the sensor profile based data centric forwarding module (DCFM) approach of the present invention enables flexible aggregation configurations, and supports any sensor type and new aggregation operators. It not only supports aggregation, but also supports filtering and efficient correlation calculations via matrix operations.

The present invention introduces construction of a transformation matrix to simultaneously calculate all necessary data aggregation, while TinyDB individually returns the result according to the query function. The data centric forwarding algorithm will be realized as a form of, computer software program, which operates on the sensor node processor.

Figure 2:
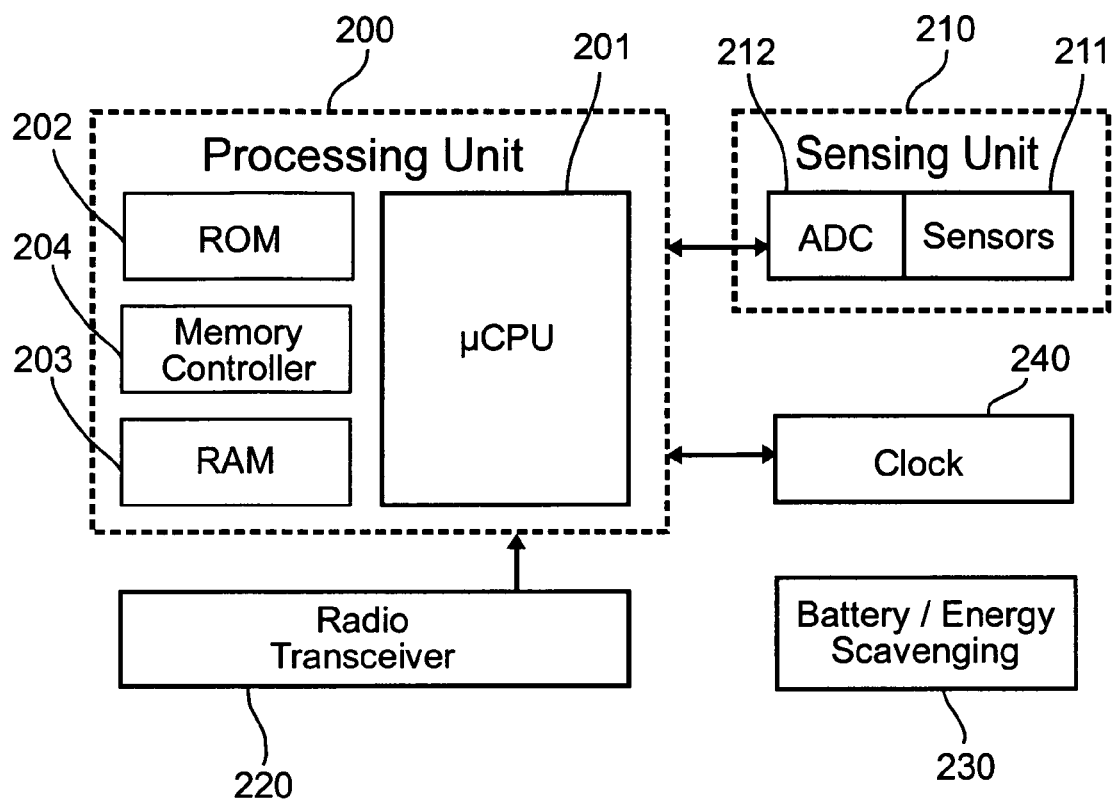
FIG. 2 illustrates a hardware diagram of a sensor node.

FIG. 2 illustrates a hardware diagram of a sensor node that is deployed in a sensing region. The sensor node includes processing unit 200, sensing unit 210, radio transceiver unit 220, power unit 230, and clock 240.

Referring to FIG. 2, a processing unit 200 consists of central processing unit (CPU) 201, read-only memory (ROM) 202 for permanent storage of instruction programs, and random-access memory (RAM) 203 for volatile operating memory. Memory controller 204 for accessing the instruction memory of the CPU may be optionally included. The processing unit may further include a flash memory. The flash memory is reprogrammable, and if executable application program of the present invention requires reprogramming, the application program can be stored in the flash memory. If the application program of the present invention does not requires reprogramming, the application program can be stored in ROM 202.

Sensing unit 210 includes sensors 211 and analog-to-digital converter (ADC) 212. Sensors 211 can be various types of sensors such as a temperature sensor, a humidity sensor, and a light sensor. Optionally, sensing unit 210 can include a standard inter-integrated circuit (I²C) bus for interfacing to devices such as electrically erasable programmable read-only memories (EEPROMs), thermal sensors, and real-time clocks.

Radio transceiver unit 220 enables wireless communication with other sensor nodes. Power unit 230 includes portable power devices such as a lithium-ion cell and a DC-DC converter. The power unit may include an optional power generator that harvests energy from the environment.

An operating system (OS) and application software execute on the main CPU to provide sensor node control. Services implemented by OS include task scheduling, inter-process communication (IPC) between tasks, memory control, data centric aggregation, data centric forwarding and possible power control in terms of voltage scaling and component activation and inactivation. The OS provides interfaces to access and control peripherals. The interfaces are typically associated with layered software components with more sophisticated functionality, for example a network protocol stack.

Figure 3:
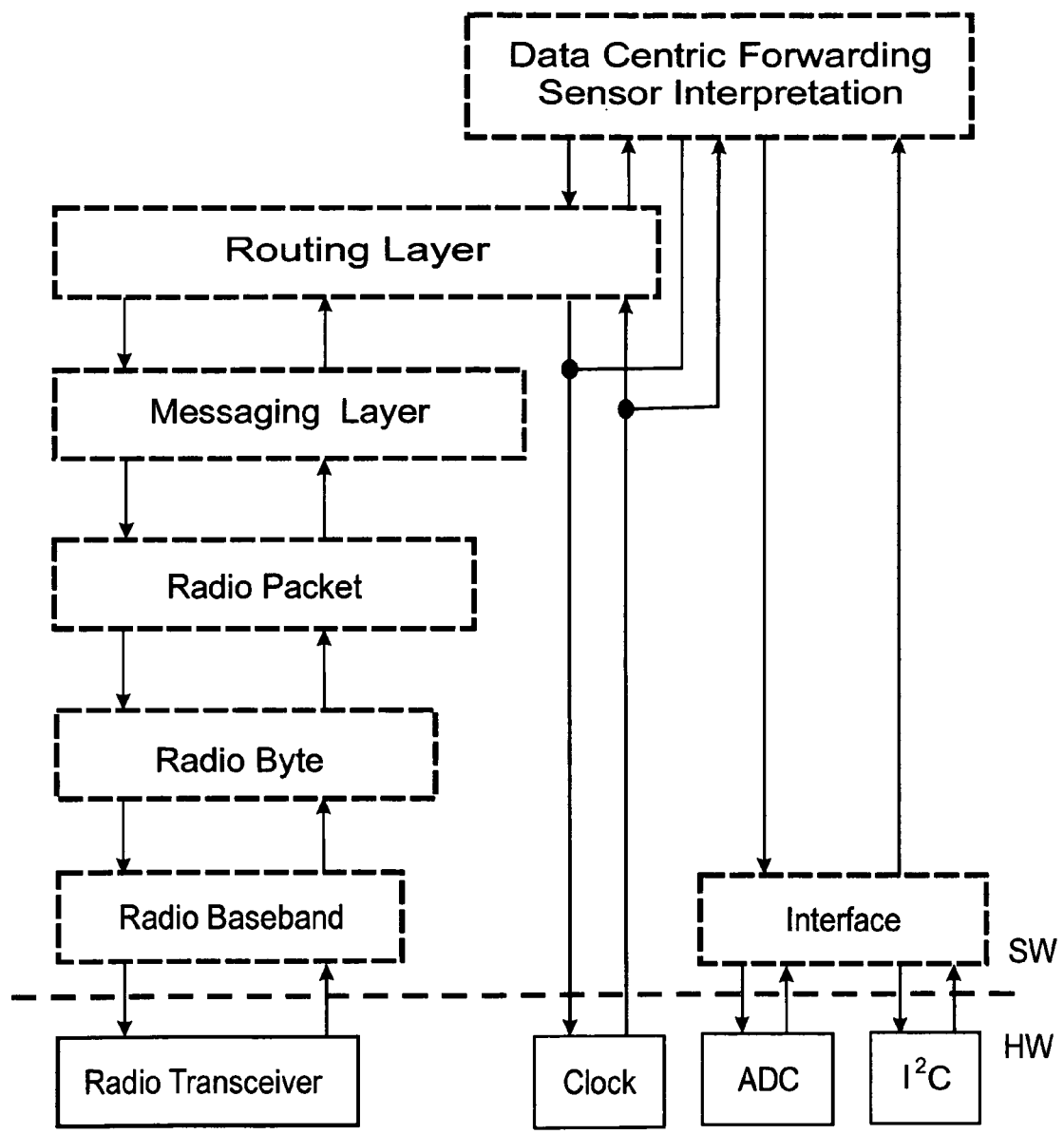
FIG. 3 depicts an example protocol stack for a wireless sensor network.

FIG. 3 depicts an example protocol stack for a wireless sensor network (WSN). There is no unified protocol stack for WSNs and most of the proposed stacks are just collections of known protocol functions. At the moment, the IEEE 1451.5 Wireless Sensor Working Group is standardizing the physical layer for WSNs with an intention to adapt link layers from other wireless standards, for example, Bluetooth, IEEE 802.15.4 low-rate wireless personal area network (LRW-PAN), or IEEE 802.11 WLAN.

The present invention provides a method for data aggregation, which is referred to as a data aggregation method based on sensor profile (SP) or a sensor profile based data aggregation method. Overall operation of the data aggregation system of the present invention requires two main platforms. One is sensor profile (SP) based aggregation module generation platform, and the other is aggregation module deployment platform. Therefore, the SP based data aggregation method of the present invention includes a module generation process and a module deployment process.

SP based aggregation module generation platform will be described hereafter. For minimum footprint, the data aggregation system of the present invention provides a SP based aggregation module generation system. The data aggregation module is completely devoid of all application specific details, and it uses a configuration driven approach. A lot of information that has traditionally been hard coded in software is read from a pluggable configuration file. This enables the aggregation module to meet its architectural goals of reusability and extensibility.

The configuration is used on the aggregation module in order to provide aggregation related configuration such as aggregation operator selection, to provide filtering configurations such as data range (MAX, MIN), real-time data checking, and to provide application specific configurations such as latency, aggregation interval.

Figure 4:
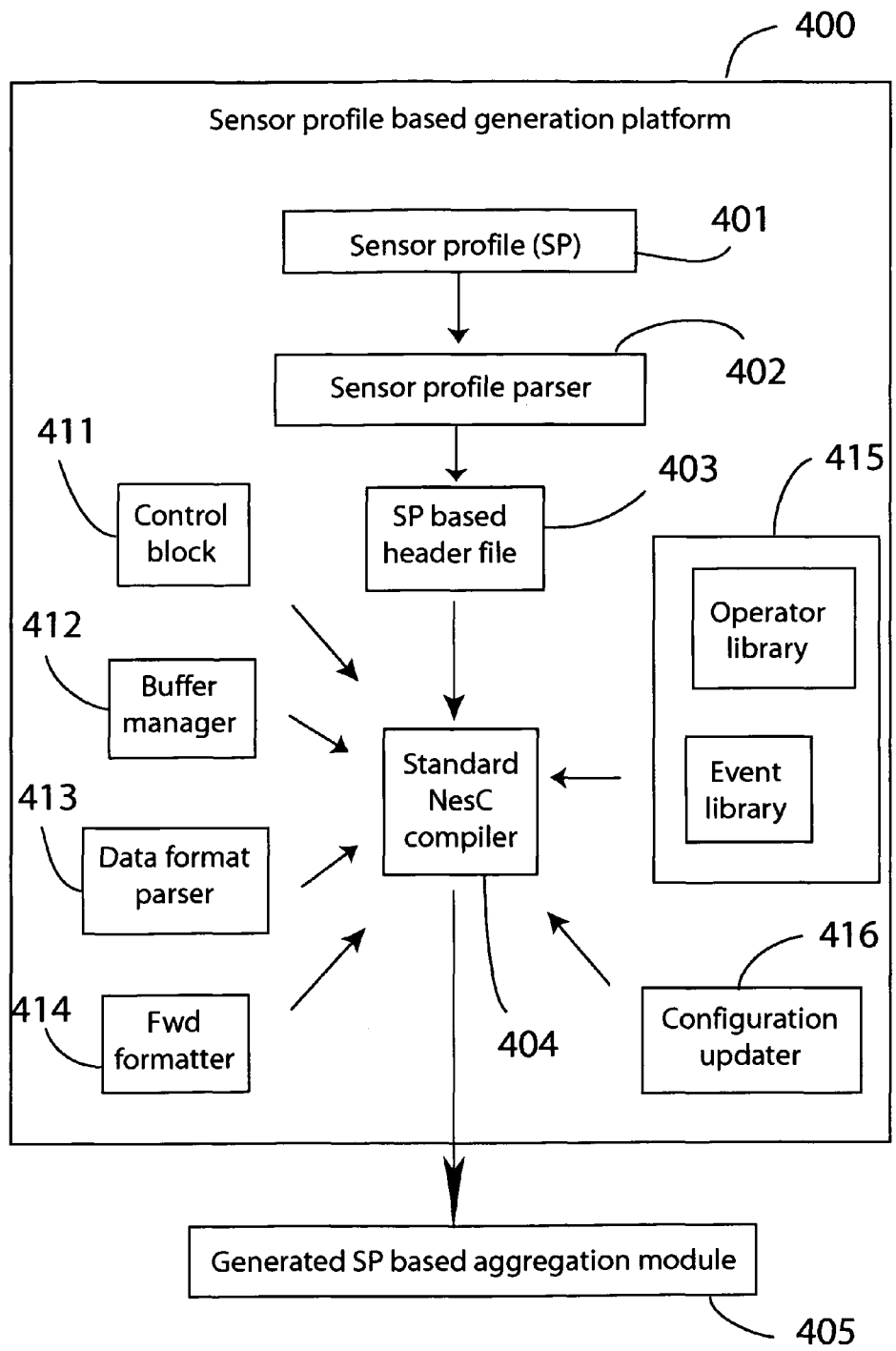
FIG. 4 shows a sensor profile (SP) based aggregation module generation platform.

SP based aggregation module generation platform 400 is shown in FIG. 4. It includes sensor profile parser 402, NesC standard compiler 404, and other aggregation related sub-modules. Sensor profile parser 402 acts like a translator. It uploads sensor profile (SP) 401 description file, parses it and represents SP in standard nesC header files 403.

The standard NesC compiler 404 then compiles the generated SP header files 403 with all the other aggregation sub-modules to generate SP based aggregation module 405. The compiled binary codes of the SP based aggregation module 405 are downloadable to sensor nodes.

Other aggregation sub-modules can include control block module 411, buffer manager 412, data format parser 413, forward formatter 414, data centric forwarding (DCF) library 415, and configuration updater 416.

Control block module 411 performs overall management operation of the data centric forwarding module (DCFM). Included are the followings: sensor-type-based data aggregation and aggregation result delivery. For sensor-type-based data aggregation, when a parsed sensor data from data format parser 413 arrives, control block module 411 performs data aggregation via its sensor-type-based sensor profile modules. For aggregation result delivery, DCFM maintains different aggregation intervals for different sensor types. When the aggregation time interval of a specific sensor type is reached, its result is forwarded to Fwd Formatter 414.

Buffer manger 412 serves as the temporary memory storage area during data aggregation.

Data format parser 413 receives a data input arriving from other node, and parses it to extract sensor data. Sensor data is sent to the control block 411 for processing.

Forward formatter 414 formats sensor data to the required format and returns the data for further routing.

DCF library 415 includes two main libraries: an event library and an operator library. These libraries are used during compile time for sensor profile module generation. The event library provides event definitions and implementations. The event library includes sensor data events like "high temperature", "low humidity", "motion detector" etc. The operator library provides data aggregation/filtering/correlation supports. The set of standard aggregation operators that DCF library supports include Sum, Max, Min, Count etc.

Configuration updater 416 updates the default configuration settings. It receives the configuration information which is broadcast by the sink, and updates the configurations of sensor profile modules. The configuration information includes application dependent control information (e.g. latency and aggregation interval), and topology-related information (in-degree).

By using SP based aggregation module generation platform, only necessary codes are compiled. When the generated aggregation module is deployed in wireless sensor network environment, the sensor profile related parameters can be dynamically updated via control messages broadcast by the sink. If the sink does not send any SP information, each node uses its default values given at the time of module generation.

Figure 5:
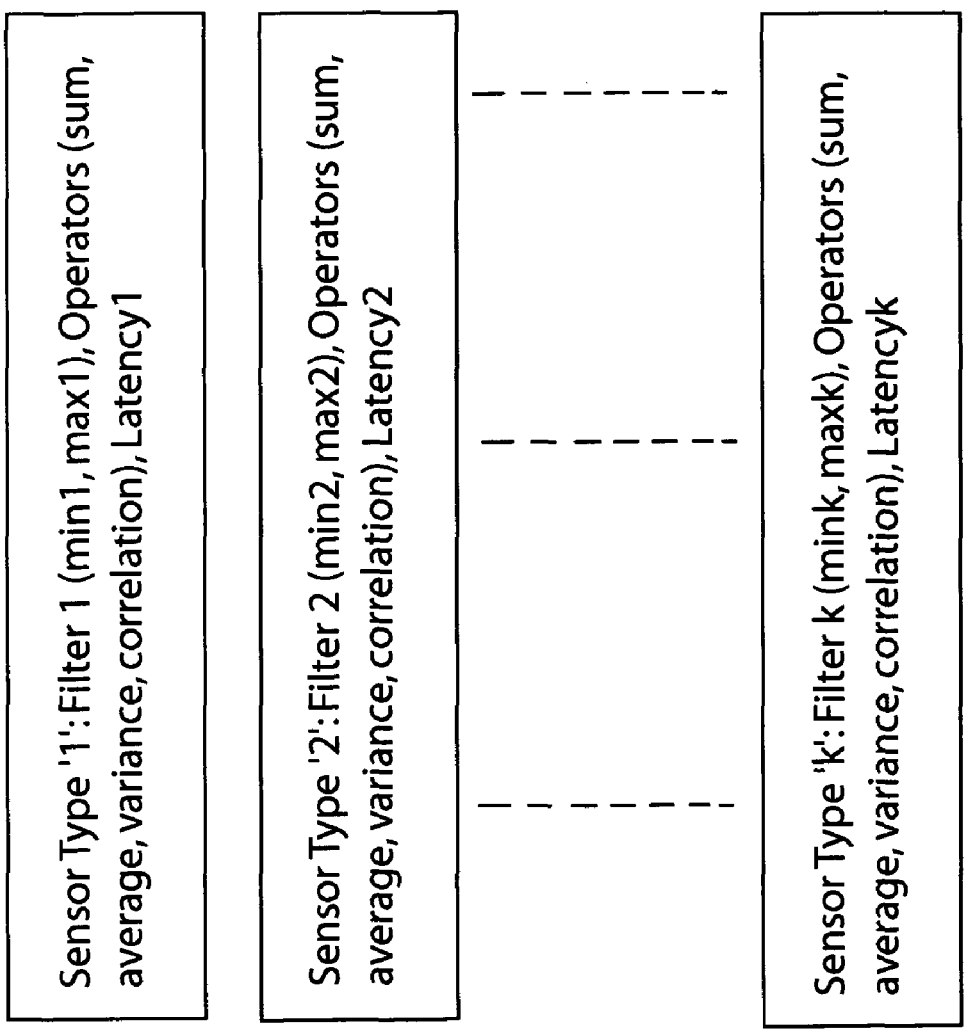
FIG. 5 shows an example of a sensor profile.

FIG. 5 shows an example of a sensor profile. The sensor profile includes information on types of sensors that are includes in sensor nodes. The sensor profile also includes necessary information for each of the sensor types. The information for each of the sensor types can be information such as aggregation operator selection, filtering configurations (or criteria) such as data range (MAX, MIN), real-time data checking, and application specific configurations such as latency, aggregation interval. Table 1 shows typical data aggregation functions (or operators) that can be included in the sensor profile.

Otherwise, the SP based aggregation/correlation operators are triggered (step S603). Based on the given sensor profile's aggregation and correlation operators, a matrix representation for them is constructed (step S604). One of the benefits of the construction of the matrix representation is that the data aggregations can be performed simultaneously for the given operators, improving efficiency and without sending additional query message. Data aggregation is then performed based on the constructed matrix representation (step S605).

TABLE 1

Typical Data Aggregation Functions

| Data Aggregation Function | Description |
| --- | --- |
| Sum | This operator generates a sum of data of a specific sensor type received in an aggregation interval for that sensor type. |
| Average | This operator generates the average of all data of each flagged sensor type received in an aggregation interval for that sensor type and computes a standard deviation. If the received data represents an average, the algorithm uses the count of previous samples provided in the message data to properly weight with samples of this data type already stored in the buffer. |
| Count | This operator increments the count of any data for each sensor type received in an aggregation interval for that sensor type. This operator is selectable by a sensor type configuration file. |
| Duplicate removal | This operator determines if a specific data value for each sensor type has been received in the aggregation interval for that sensor type. If the received data represents a duplicate value, the time-stamp of this new data, if provided, replaces the time stamp of the corresponding buffered data. |
| Min-Max filtering | This operator discards any received data value that is outside the range set by [MIN, MAX] values for that sensor data type. The [MIN, MAX] range is specified in the sensor type configuration file. This operator is selectable by a sensor type configuration file. |
| Maximum latency | This operator discards any received data value that exceeds the maximum latency for that data type. The maximum latency is specified in the sensor type configuration file. |
| Temporal correlation | This operator determines if received data value falls within the temporal variation characteristric of the sensed phenomenon. Into this category falls event tracking described by a correlation function between consecutive events. The sensor type configuration file provides the correlation characteristic for each tagged data type. |
| Spatial correlation | This operator determines the correlation among events within a geographical region defined by grid, zone, Voroni diagram. Typical sensor applications require spatially dense sensor deployment in order to achieve satisfactory coverage. As a result, multiple sensors record information about a single event in the sensor field. Due to high density in the network topology, spatially proximal sensor observations are highly correlated with the degree of correlation increasing with decreasing internode separation. The total bits transported for an event can be minimized if data from correlated sources is compressed enroute. The sensor type configuration file provides the correlation characteristic for each tagged data type. |
| Out of range | This operator nulls any received data value that is out of range when not specified by [MIN, MAX] values. Generally, this pertains to error conditions caused in transmission or from a sensor fault. |

An application program, which includes the SP based aggregation module, is installed in a sensor node. Specifically the program can be stored in the flash memory of sensor nodes, and performs data aggregation when it is triggered.

Figure 6:
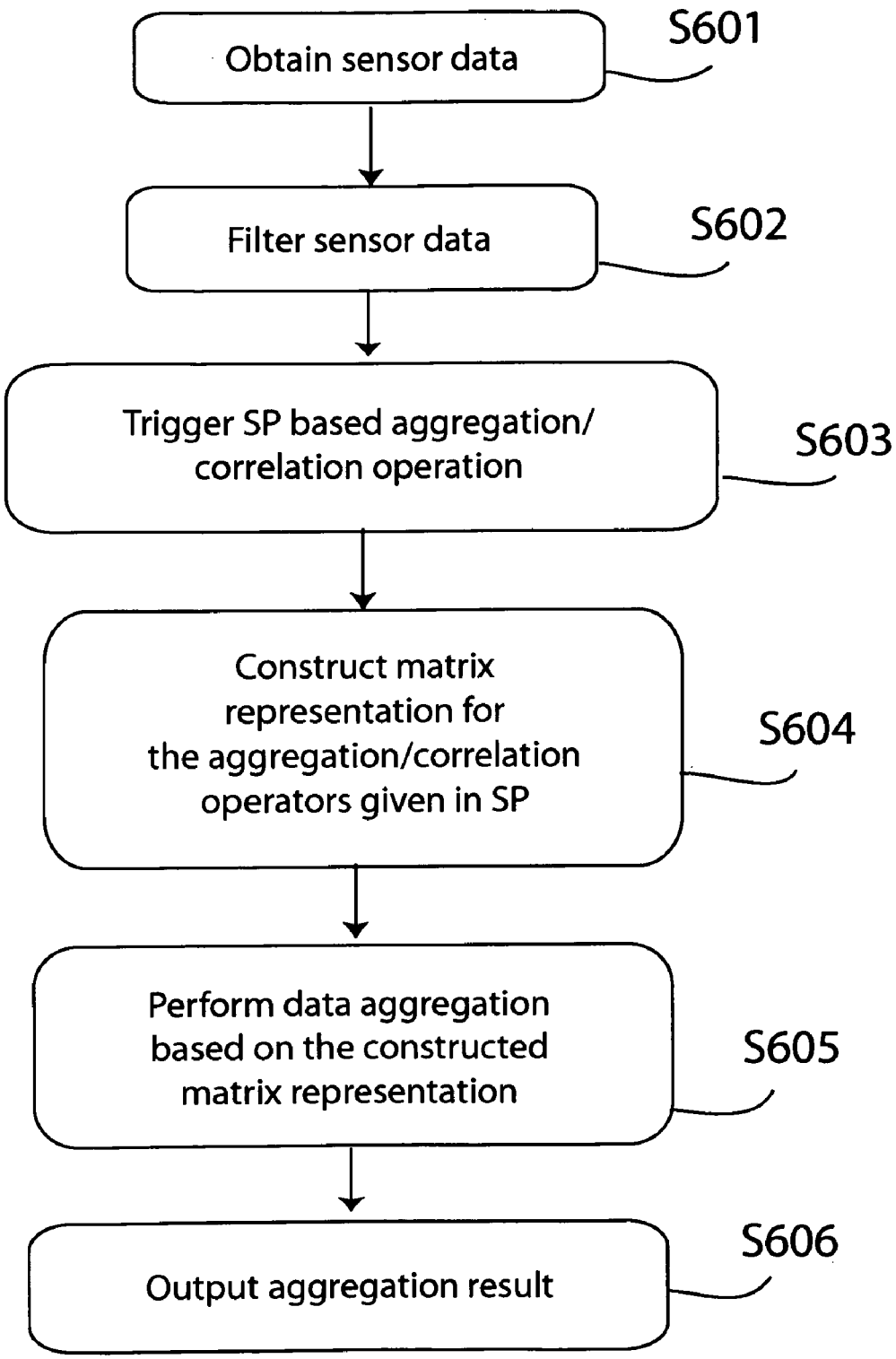
FIG. 6 shows a flowchart for aggregation module deployment platform.

Once the application program including the SP based aggregation module is installed in a sensor node, aggregation module deployment process is performed. FIG. 6 shows a flowchart for aggregation module deployment platform. When the sensor node receives sensor data from a local sensor included in a sensor node of the sensor network or neighbor sensor nodes (step S601), the module deployment process begins. Herein, the neighbor sensor node to the node is its 1-hop sensor node. The sensor data is first filtered (step S602). If the sensor data can not pass filtering criteria, for example being out of range or exceeding the maximum latency requirements, the sensor data will be discarded and no aggregation is performed. The filtering criteria are included in sensor profile 401 shown in FIG. 4, and compiled into SP based aggregation module 405.

The matrix construction specifies the manipulation of data from one or more sensors to achieve an interpretation for a given scenario. A separate module performs matrix operation each time the SP-based data aggregation is triggered. After the aggregation, the aggregated result will be output (step S606), and given to next sub-module. For example, the aggregated result can be forwarded to next node-en-route.

This present invention uses vector and matrix operations to perform efficient aggregation in sensor networks. The basic structure can be represented in Equation (1).

$$\Re = \vec{A} \cdot \overline{\overline{H}} + \vec{B} \qquad (1)$$

where $\Re$=Resultant of data aggregation operation $\vec{A}$=row vector comprised of sensor data $(a_1\ a_2\ a_3\ \ldots\ a_N)$ $\vec{B}$=additive vector $\overline{\overline{H}}$=transformation operator matrix of dimension N×M Equation (1) has the form of a straight-line equation in the N-dimensional data space. The row vector can be referred to as a first array, and contains sensor data as it elements. The transformation operator matrix has N rows and M columns. Therefore, a number of rows N of the transformation matrix is equal to the size of the first array (a number of the sensor data), and each column of the transformation matrix represents one of the given operators. In the case of N×M transformation matrix, there is M operators.

The aggregation operator matrix is constructed from the following operation.

Sum:

$$(a_1 + a_2 + \ldots + a_N) = (a_1 \ a_2 \ \ldots \ a_N) \begin{pmatrix} 1 \\ 1 \\ \vdots \\ 1 \end{pmatrix} \quad (2)$$

Average:

$$\bar{a} = \left(\frac{a_1 + a_2 + \ldots + a_N}{N}\right) = (a_1 \ a_2 \ \ldots \ a_N) \begin{pmatrix} 1/N \\ 1/N \\ \vdots \\ 1/N \end{pmatrix} \quad (3)$$

Variance:

$$\sigma^2 = \sum_{n=1}^{N} (a_n - \bar{a})^2 \quad (4)$$

$$= \sum_{n=1}^{N} a_n^2 - 2\bar{a} \cdot \sum_{n=1}^{N} a_n + N\bar{a}^2$$

$$= \sum_{n=1}^{N} a_n^2 - N(\bar{a})^2$$

$$= (a_1 \ a_2 \ \ldots \ a_N) \begin{pmatrix} a_1 \\ a_2 \\ \vdots \\ a_N \end{pmatrix} - N(\bar{a})^2$$

Correlation coefficient: The model of the correlation of temporal or spatial sensor events is expressed as a data pairs:

$$\{A, C\} = [(a_1, c_1)(a_2, c_2) \ldots (a_N, c_N)] \quad (5)$$

The correlation coefficient between data set A and data set B is:

$$R_{AC} = \frac{1}{N-1} \sum_{n=1}^{N} \left(\frac{a_n - \bar{a}}{s_a}\right)\left(\frac{c_n - \bar{c}}{s_c}\right) \quad (6)$$

$$= \frac{1}{N-1} \cdot \frac{\sum_{n=1}^{N} a_n c_n - N\bar{a} \cdot \bar{c}}{s_a s_c}$$

$$= \frac{1}{s_a s_c (N-1)} \left[ (a_1 \ a_2 \ \ldots \ a_N) \begin{pmatrix} c_1 \\ c_2 \\ \vdots \\ c_N \end{pmatrix} - N\bar{a} \cdot \bar{c} \right]$$

where S=standard deviation

Note that a set of data aggregation functions can be represented in terms of combinations of vector products. Hence, it is possible to construct an operator matrix that produces a desired set of data aggregation results expressed as a data vector. The transform operator matrix is constructed by inserting a column for each aggregation operation required. In one implementation where the desired aggregation functions comprise sum, average, variance (or standard deviation), and correlation (A,C), Equation (1) has the form expressed in Equation (7).

$$\text{Aggregation Operation} = [\text{SUM} \ \text{AVG} \ \text{VAR} \ \text{CORR}] \quad (7)$$

$$\mathfrak{R}(\text{SUM, AVG, VAR, CORR}) =$$

$$(a_1 \ a_2 \ \ldots \ a_N) \cdot \begin{bmatrix} 1 & 1/N & a_1 & Dc_1 \\ 1 & 1/N & a_2 & Dc_2 \\ \vdots & \vdots & \vdots & \vdots \\ 1 & 1/N & a_N & Dc_N \end{bmatrix} -$$

$$N \cdot (0 \ 0 \ \bar{a}^2 \ 0) - D \cdot (0 \ 0 \ 0 \ \bar{a} \cdot \bar{c})$$

where $\vec{B} = -N \cdot (0 \ 0 \ \bar{a}^2 \ 0) - D \cdot (0 \ 0 \ 0 \ \bar{a} \cdot \bar{c})$ The transform operator matrix H has a column for each type of aggregation function and the vector B has corresponding entries. Hence, the data aggregation operator is scalable. With multiple sensor types for which data aggregation must be performed, Equation (7) is applied to each data set independently. In this situation, Equation (1) has the form expressed in Equation (8).

$$\overline{\overline{\mathfrak{R}}} = \vec{G} * (\vec{A} \ \overline{\overline{H}} + \vec{B}) \quad (8)$$

$\mathfrak{R}$, A and B become arrays, G is the sensor selector array and * means element-wise multiplication between matrices.

This formulation greatly reduces the required program memory, provides scalability in terms of basic vector operations and adds computational strength with a correlation capability.

The present invention also provides a sensor node that is included in a sensor network shown in FIG. 1. As shown in FIG. 2, the sensor node includes processing unit 200, sensing unit 210, and radio transceiver. Processing unit 200 includes central processing unit (CPU) 201, read-only memory (ROM) 202 for permanent storage of instruction programs, and random-access memory (RAM) 203 for volatile operating memory. Sensing unit 210 includes sensors 211 and analog-to-digital converter (ADC) 212. Sensors 211 can be various types of sensors such as a temperature sensor, a humidity sensor, and a light sensor. Radio transceiver unit 220 is coupled to the central processing unit, the radio transceiver unit communicating with other sensor node.

An application program (software or a module) is provided to perform the SP based data aggregation process described above. The application program is installed in a sensor node.

Specifically the program can be stored in the flash memory (sensor node usually has a flash memory, e.g. TI CC2431 SoC). In order to run the program, it is necessary to download the application program into the flash memory. In general, the sensor node has a machine readable storage medium, and the application program can be stored in the machine readable storage medium. The application program includes instructions that are built through the processes shown in FIG. 4. The application program, when executed by central processing unit 201, performs operations for the data aggregation process described above.

The application program can be implemented in any operating system. The feasibility of SP based module generation and module deployment process was proved by implementing the application program of the present invention on TinyOS system. The application program of the present invention, however, can be implemented in any operating system for sensor nodes. The examples of the operating systems includes TinyOS, PicOS, Mantis, Contiki, SOS, and Maté.

The module deployment process of the present invention includes a matrix construction to reduce the number of operations, and enable efficient data aggregation. Here we define the basic mathematical operations as sum, minus, multiplication and division. For example, in the correlation coefficient calculations of Equation (6), if the original mathematical formulas are used, it will need a number of operations of 6N+1. By using the matrix representation and vector operations, the number of operations is reduced to 2N+7. The reduced correspondingly operations reduce memory cost and improves the aggregation efficiency. The idea also applies to variance calculation and other similar operations.

To be memory-efficient, the method of the present invention provides two features. One is sensor profile based approach. TinyDB uses SQL-based query mechanism to specify aggregation operator (e.g. sum, count or average) and then perform the corresponding aggregation based on the specified operator. However, to realize the SQL-based query mechanism, it is very memory-intensive. To overcome this problem and create minimum footprint, in the data aggregation method of the present invention, a sensor profile based method is used to specify aggregation operations. Sensor Profile is a configuration file, which specifies the aggregation/correlation operator for each sensor type. Sensor profile is parsed during compile time and converted into header files, which are then compiled into sensor executable code and downloaded into each node. The sensor profile can be dynamically updated by the control message sent by the sink. By using this approach, most of parsing work as SQL-based query scheme needs is done during compile time, only necessary aggregation and/or correlation operators are compiled and the run-time memory is thus saved.

The other is matrix representation to reduce the number of mathematical operations. The matrix representation for correlation and variance can reduce the number of operations. For example, in correlation, we need 6N+1 operations (minus, division, multiplication). In the matrix representation, it can reduce to be 2N+7 operations. This idea applies to variance calculations too. Reduced number of operations can reduce memory requirements correspondingly.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for aggregating data in a sensor network that includes a plurality of sensor nodes, the method comprising:

determining types of sensors included in the sensor nodes;

generating a sensor profile that includes information on each type of the sensors, the information including a filtering criterion and aggregation operators defined for the each type of the sensors;

generating a sensor profile based aggregation module from the sensor profile;

installing the sensor profile based aggregation module to each of the sensor nodes;

receiving sensor data via one of the sensor nodes from a local sensor;

filtering the sensor data according to the filtering criterion defined for the type of the local sensor;

selecting at least one operator for data aggregation among the aggregation operators defined for the each type of the sensors; and performing data aggregation simultaneously with the at least one operator.

2. The method of claim 1, wherein the local sensor is includes in a local sensor node or in a neighbor sensor node.

3. The method of claim 1, wherein the step of generating the sensor profile based aggregation module comprises steps of:

parsing the sensor profile to generate a header file; and compiling the header file.

4. The method of claim 3, wherein the step of compiling the header file further includes a step of compiling a data format parser with the header file, the data format parser parsing a data input to extract the sensor data.

5. The method of claim 4, wherein the step of compiling the header file further includes a step of compiling a control block module with the header file, the control block module receiving the sensor data from the data format parser and performing data aggregation with the sensor data.

6. The method of claim 3, wherein the step of compiling the header file further includes a step of compiling a data centric forwarding library with the header file, the data centric forwarding library including event definition and definitions of the aggregation operators.

7. The method of claim 1, wherein the step of performing data aggregation comprises steps of:

constructing a row vector array from the sensor data;

constructing a transformation matrix, a number of rows of the transformation matrix being equal to the size of the row vector, a column of the transformation matrix representing the at least one operator; and multiplying the row vector by the transformation matrix.

8. The method of claim 7, wherein the aggregation operator includes a sum operator, the column of the transformation matrix for the sum operator being represented by a summation formula:

$$\begin{pmatrix} 1 \\ 1 \\ \vdots \\ 1 \end{pmatrix}.$$

9. The method of claim 7, wherein the aggregation operator includes an average operator, the column of the transforma tion matrix for the average operator being represented by an average formula:

$$\begin{pmatrix} 1/N \\ 1/N \\ \vdots \\ 1/N \end{pmatrix},$$

where N is a number of the sensor data.

10. The method of claim 7, wherein the aggregation operator includes a variation operator, the column of the transformation matrix for the variation operator being represented by a first variation formula:

$$\begin{pmatrix} a_1 \\ a_2 \\ \vdots \\ a_N \end{pmatrix}$$

where $a_1\ a_2\ a_3 \ldots a_N$ are column elements of the first array.

11. The method of claim 1, wherein the information further includes aggregation interval and latency for the each type of the sensors.

12. A sensor node deployed in a sensor network, the sensor node comprising:
  a central processing unit;
  a sensor coupled to the central processing unit;
  a radio transceiver unit coupled to the central processing unit, the radio transceiver unit communicating with other sensor node; and
  a machine readable storage medium coupled to the central processing unit, the machine readable storage medium including an instruction that includes a sensor profile that includes information on each type of local sensors that are deployed in the sensor network, the information including a filtering criterion and aggregation operators defined for the each type of the local sensors, the instruction causing the central processing unit to perform operations when executed by the central processing unit, the operations comprising:
  receiving sensor data from the local sensors through the radio transceiver;
  filtering the sensor data according to the filtering criterion defined for the type of the local sensor;
  selecting at least one operator for data aggregation among the aggregation operators defined for the each type of the sensors; and
  performing data aggregation simultaneously with the at least one operator.

13. The method of claim 12, wherein the step of performing data aggregation comprises steps of:
  constructing a row vector array from the sensor data;
  constructing a transformation matrix, a number of rows of the transformation matrix being equal to the size of the row vector, a column of the transformation matrix representing the at least one operator; and
  multiplying the row vector by the transformation matrix.

14. The method of claim 12, wherein the instruction includes a module for a data format parser that parses a data input to extract the sensor data.

15. The method of claim 14, wherein the instruction includes a control block module that receives the sensor data from the module for data format parser and performs data aggregation with the sensor data.

16. The method of claim 12, wherein the instruction includes a module for a data centric forwarding library that includes event definition and definitions of the aggregation operators.

* * * * *